(12) United States Patent
Landa et al.

(10) Patent No.: US 11,890,879 B2
(45) Date of Patent: Feb. 6, 2024

(54) INTERMEDIATE TRANSFER MEMBER

(71) Applicant: LANDA CORPORATION LTD., Rehovot (IL)

(72) Inventors: Benzion Landa, Nes Ziona (IL); Sagi Abramovich, Ra'anana (IL); Moshe Levanon, Rehovot (IL); Helena Chechik, Rehovot (IL); Tatiana Kurtser, Petach Tikva (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/116,668

(22) Filed: Mar. 2, 2023

(65) Prior Publication Data
US 2023/0278346 A1     Sep. 7, 2023

Related U.S. Application Data

(63) Continuation of application No. 17/712,198, filed on Apr. 4, 2022, now Pat. No. 11,628,674, which is a (Continued)

(30) Foreign Application Priority Data

May 30, 2016   (GB) ..................... 1609463

(51) Int. Cl.
*B41J 2/22*      (2006.01)
*B32B 5/26*      (2006.01)
(Continued)

(52) U.S. Cl.
CPC ............... *B41J 2/22* (2013.01); *B32B 5/26* (2013.01); *B32B 7/02* (2013.01); *B32B 7/06* (2013.01);
(Continued)

(58) Field of Classification Search
CPC ...... B41J 2/0057; B41J 2/22; B41J 2002/012; B41M 5/36; B41M 5/52
See application file for complete search history.

(56) References Cited

U.S. PATENT DOCUMENTS

| | | |
|---|---|---|
| 3,837,878 A | 9/1974 | Beers |
| 5,278,199 A | 1/1994 | Ohkawa et al. |
| | (Continued) | |

FOREIGN PATENT DOCUMENTS

| | | |
|---|---|---|
| CN | 101433074 A | 5/2009 |
| CN | 102566343 A | 7/2012 |
| | (Continued) | |

OTHER PUBLICATIONS

CN101433074A Machine Translation (by EPO and Google)—published May 13, 2009; Kyocera Mita Corp [JP].
(Continued)

*Primary Examiner* — John Zimmermann
(74) *Attorney, Agent, or Firm* — Momentum IP; Marc Van Dyke

(57) ABSTRACT

An intermediate transfer member (ITM) for use with a printing system, the ITM having (a) a support layer; and (b) a release layer having an ink reception surface and a second surface opposing the ink reception surface, the second surface attached to the support layer, the release layer formed of an addition-cured, hydrophobic silicone material, wherein the release surface of the release layer has relatively hydrophilic properties with respect to the addition-cured, hydrophobic silicone material.

20 Claims, 4 Drawing Sheets

Related U.S. Application Data continuation of application No. 17/088,257, filed on Nov. 3, 2020, now Pat. No. 11,327,413, which is a continuation of application No. 16/303,615, filed as application No. PCT/IB2017/053167 on May 30, 2017, now Pat. No. 10,889,128.

(60) Provisional application No. 62/343,108, filed on May 30, 2016.

(51) Int. Cl.

| | | |
|---|---|---|
| *B32B 7/06* | (2019.01) | |
| *B32B 7/12* | (2006.01) | |
| *B32B 15/14* | (2006.01) | |
| *B32B 15/20* | (2006.01) | |
| *B32B 25/08* | (2006.01) | |
| *B32B 25/20* | (2006.01) | |
| *B32B 27/18* | (2006.01) | |
| *B32B 27/36* | (2006.01) | |
| *G03G 7/00* | (2006.01) | |
| *B32B 7/02* | (2019.01) | |
| *B32B 37/26* | (2006.01) | |
| *B32B 27/28* | (2006.01) | |
| *B32B 27/40* | (2006.01) | |
| *B32B 37/24* | (2006.01) | |

(52) U.S. Cl.
CPC .............. *B32B 15/14* (2013.01); *B32B 15/20* (2013.01); *B32B 25/08* (2013.01); *B32B 25/20* (2013.01); *B32B 27/18* (2013.01); *B32B 27/36* (2013.01); *G03G 7/0086* (2013.01); *G03G 7/0093* (2013.01); *B32B 27/281* (2013.01); *B32B 27/40* (2013.01); *B32B 37/24* (2013.01); *B32B 2037/243* (2013.01); *B32B 2037/268* (2013.01); *B32B 2255/02* (2013.01); *B32B 2255/06* (2013.01); *B32B 2255/26* (2013.01); *B32B 2255/28* (2013.01); *B32B 2260/021* (2013.01); *B32B 2260/046* (2013.01); *B32B 2260/048* (2013.01); *B32B 2307/21* (2013.01); *B32B 2307/538* (2013.01); *B32B 2307/546* (2013.01); *B32B 2307/73* (2013.01); *B32B 2307/732* (2013.01); *B32B 2307/744* (2013.01); *B32B 2307/748* (2013.01); *B32B 2307/75* (2013.01); *B32B 2311/24* (2013.01); *B32B 2559/00* (2013.01)

(56) References Cited

U.S. PATENT DOCUMENTS

| | | | |
|---|---|---|---|
| 5,757,390 A | 5/1998 | Gragg et al. | |
| 7,419,257 B2 | 9/2008 | Mouri et al. | |
| 8,632,147 B2 | 1/2014 | Onishi | |
| 9,044,932 B2 | 6/2015 | Ohnishi et al. | |
| 9,969,182 B2 | 5/2018 | Torisaka et al. | |
| 10,052,865 B2 | 8/2018 | Goto | |
| 10,336,060 B2 | 7/2019 | Liu | |
| 10,682,837 B2 * | 6/2020 | Martinez de Leon | .... B32B 1/02 |
| 10,703,093 B2 | 7/2020 | Karlinski et al. | |
| 11,628,674 B2 | 4/2023 | Landa et al. | |
| 2003/0118381 A1 | 6/2003 | Law et al. | |
| 2004/0105971 A1 | 6/2004 | Parrinello et al. | |
| 2006/0175559 A1 | 8/2006 | Fischer et al. | |
| 2008/0101895 A1 | 5/2008 | Holcomb et al. | |
| 2008/0232867 A1 | 9/2008 | Minbu et al. | |
| 2008/0295724 A1 | 12/2008 | Lohweg et al. | |
| 2009/0073222 A1 | 3/2009 | Hori | |
| 2010/0284705 A1 | 11/2010 | Aoki et al. | |
| 2012/0249630 A1 | 10/2012 | Bugner et al. | |
| 2012/0280447 A1 | 11/2012 | Kayanuma | |
| 2013/0016156 A1 | 1/2013 | Ooishi et al. | |
| 2013/0229457 A1 | 9/2013 | Yu | |
| 2014/0168313 A1 | 6/2014 | Ramesh et al. | |
| 2014/0176641 A1 | 6/2014 | Hawryschuk et al. | |
| 2014/0369722 A1 | 12/2014 | Soira et al. | |
| 2015/0097906 A1 | 4/2015 | Beier et al. | |
| 2015/0273835 A1 | 10/2015 | Arimizu et al. | |
| 2015/0343797 A1 | 12/2015 | Song et al. | |
| 2015/0375474 A1 | 12/2015 | DeGolier et al. | |
| 2015/0375543 A1 | 12/2015 | Barnett et al. | |
| 2016/0067974 A1 | 3/2016 | Williams | |
| 2016/0274519 A1 | 9/2016 | Lim et al. | |
| 2017/0282599 A1 | 10/2017 | Ido | |
| 2018/0281382 A1 | 10/2018 | Umezawa et al. | |
| 2019/0033756 A1 * | 1/2019 | Inotaev | .................. B32B 27/40 |
| 2019/0232638 A1 | 8/2019 | Ziegenbalg et al. | |
| 2020/0073301 A1 | 3/2020 | Sakai et al. | |
| 2020/0361715 A1 | 11/2020 | Meier | |
| 2020/0376860 A1 | 12/2020 | Paker et al. | |
| 2021/0055666 A1 | 2/2021 | Landa et al. | |

FOREIGN PATENT DOCUMENTS

| | | |
|---|---|---|
| CN | 105844621 A | 8/2016 |
| CN | 107879147 A | 4/2018 |
| DE | 102012011783 A1 | 12/2013 |
| EP | 0953450 A1 | 11/1999 |
| JP | S63274572 A | 11/1988 |
| JP | H05249870 A | 9/1993 |
| JP | H08272224 A | 10/1996 |
| JP | 2000094660 A | 4/2000 |
| JP | 2000337464 A | 12/2000 |
| JP | 2002307815 A | 10/2002 |
| JP | 2003107819 A | 4/2003 |
| JP | 2003227549 A | 8/2003 |
| JP | 2004117118 A | 4/2004 |
| JP | 2004126380 A | 4/2004 |
| JP | 2005215645 A | 8/2005 |
| JP | 3712547 B2 | 11/2005 |
| JP | 2006256087 A | 9/2006 |
| JP | 2007072449 A | 3/2007 |
| JP | 2009258587 A | 11/2009 |
| JP | 2009279808 A | 12/2009 |
| JP | 2010076214 A | 4/2010 |
| JP | 2011081061 A | 4/2011 |
| JP | 2012081770 A | 4/2012 |
| JP | 2014019092 A | 2/2014 |
| JP | 2018017429 A | 2/2018 |
| JP | 2020014350 A | 1/2020 |
| WO | 2015036865 A1 | 3/2015 |
| WO | 2017208152 A1 | 12/2017 |
| WO | 2019012456 A1 | 1/2019 |
| WO | 2019111223 A1 | 6/2019 |
| WO | 2020003088 A1 | 1/2020 |
| WO | 2020136517 A1 | 7/2020 |
| WO | 2020141465 A1 | 7/2020 |
| WO | 2021137063 A1 | 7/2021 |

OTHER PUBLICATIONS

CN102566343A Machine Translation (by EPO and Google)—published Jul. 11, 2012; Canon KK.

CN105844621A Machine Translation (by EPO and Google)—published Aug. 10, 2016; Fuyang Feiyang Printing Co Ltd.

CN107879147A Machine Translation (by EPO and Google)—published Apr. 6, 2018; Brother Ind Ltd.

DE102012011783A1 Machine Translation (by EPO, PlatPat and Google)—published Dec. 19, 2013; Heidelberger Druckmasch AG. IP.com search (Year: 2022).

JP2000094660A Machine Translation (by EPO and Google)—published Apr. 4, 2000; Brother Ind Ltd.

JP2000337464A Machine Translation (by EPO and Google)—published Dec. 5, 2000; Fuji Xerox Co Ltd.

JP2003107819A Machine Translation (by EPO and Google)—published Apr. 9, 2003; Kanegafuchi Chemical Ind.

JP2003227549A Machine Translation (by EPO, PlatPat and Google)—published Aug. 15, 2003; Xerox Corp.

(56) References Cited

OTHER PUBLICATIONS

JP2004117118A Machine Translation (by EPO and Google)—published Apr. 15, 2004; Nidec Copal Corp.
JP2006256087 Machine Translation (by EPO and Google)—published Sep. 28, 2006; Ricoh Printing Sys Ltd.
JP2009258587A Machine Translation (by EPO and Google)—published Nov. 5, 2009; Fuji Xerox Co Ltd.
JP2009279808A Machine Translation (by EPO and Google)—published Dec. 3, 2009; Fuji Xerox Co Ltd.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP3712547B2 Machine Translation (EPO, PlatPat and Google) published on Nov. 2, 2005 Sasaya Shunji.
JPH05249870A Machine Translation (by EPO, PlatPat and Google)—published Sep. 28, 1993; Matsushita Electric Ind Co Ltd.
JPH08272224A Machine Translation (by EPO, PlatPat and Google)—published Oct. 18, 1996; Ricoh KK.
JPS63274572A Machine Translation (by EPO and Google)—published Nov. 11, 1988; Canon KK.
JP2002307815A Machine Translation (by EPO and Google)—published Oct. 23, 2002; Konishiroku Photo Ind.
JP2004126380A Machine Translation (by EPO and Google)—published Apr. 22, 2004; Sumitomo Rubber Ind.
JP2005215645A Machine Translation (by EPO and Google)—published Aug. 11, 2005; Fuji Xerox Co Ltd.
JP2007072449A Machine Translation (by EPO and Google)—published Mar. 22, 2007; Fuji Xerox Co Ltd.
JP2011081061A Machine Translation (by EPO and Google)—published Apr. 21, 2011; Canon KK.
JP2014019092A Machine Translation (by EPO and Google)—published Feb. 3, 2014; Ricoh Co Ltd.

* cited by examiner

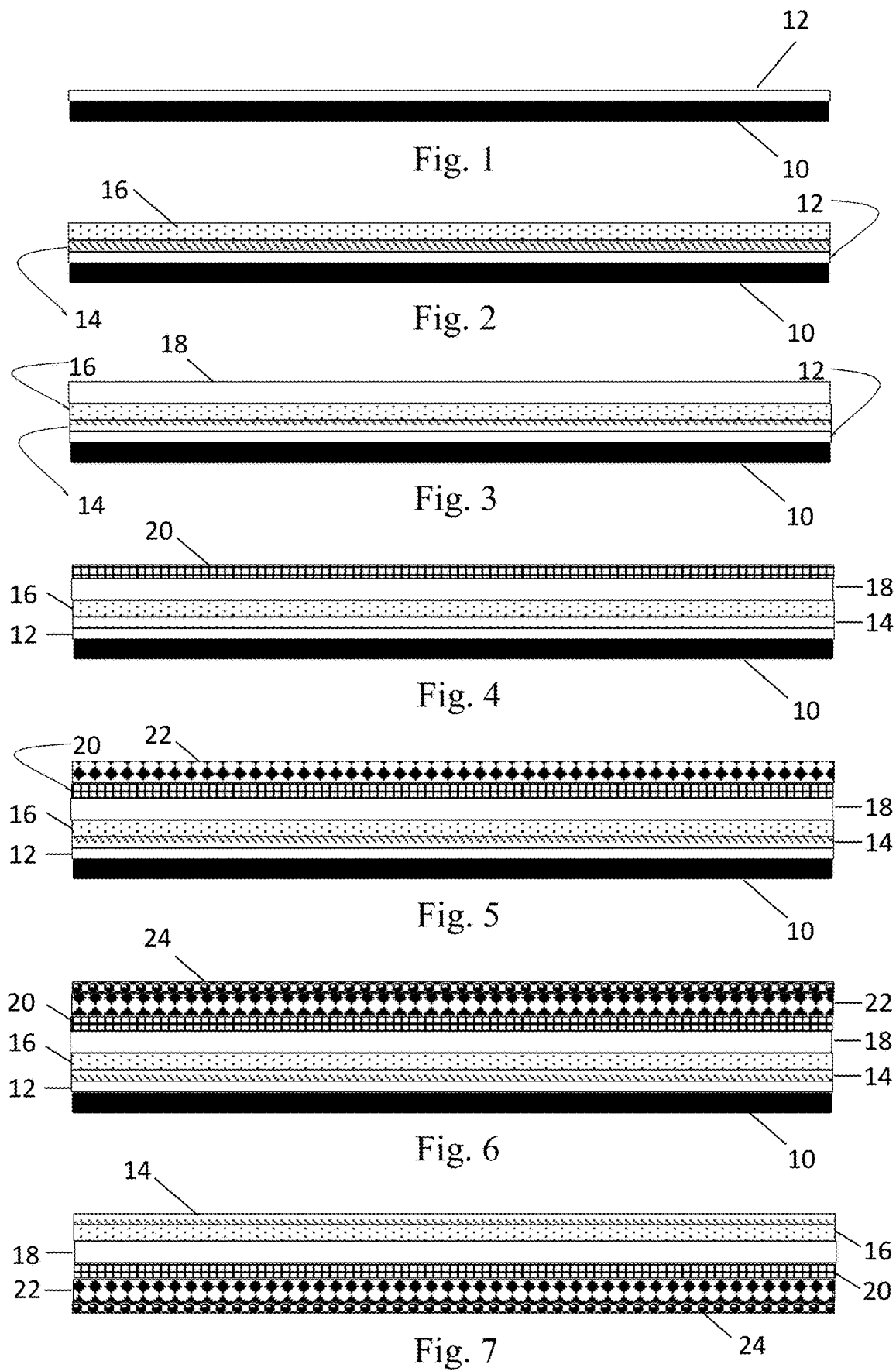

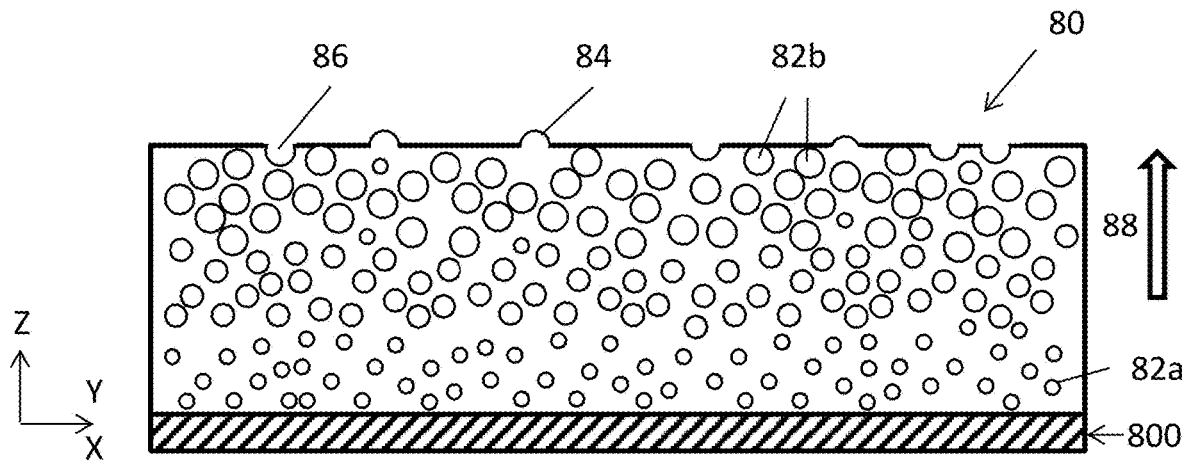
Fig. 8A – Prior Art
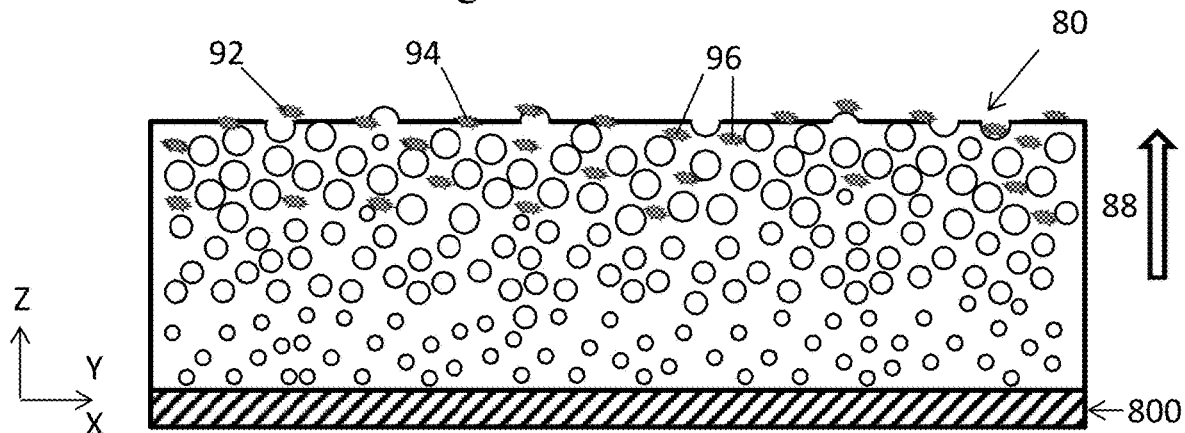
Fig. 8B – Prior Art
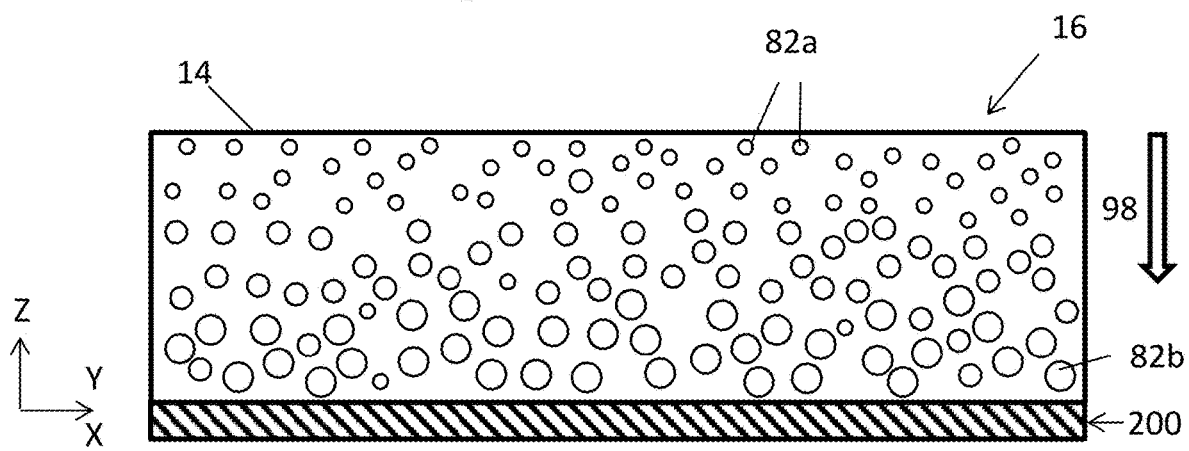
Fig. 8C

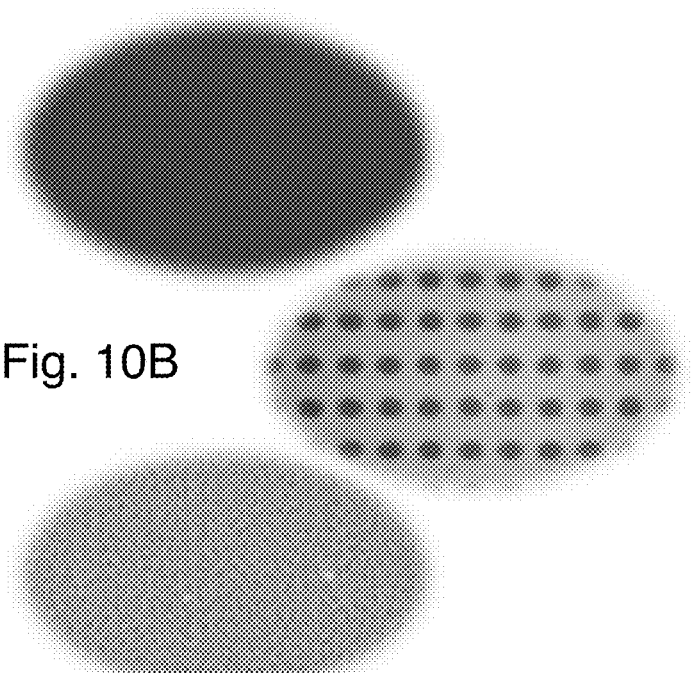
Fig.10A
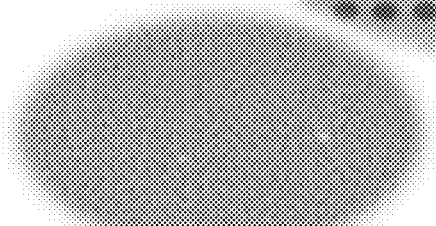
Fig. 10B
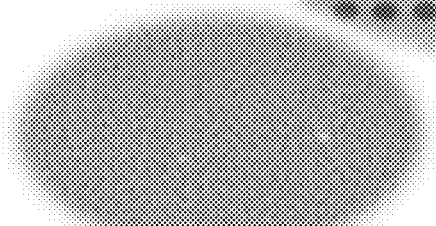
Fig. 10C
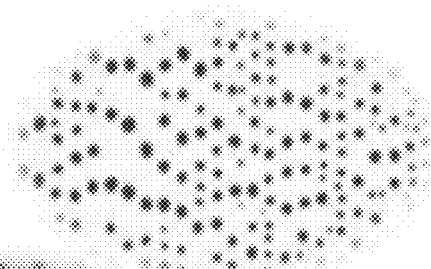
Fig. 11A
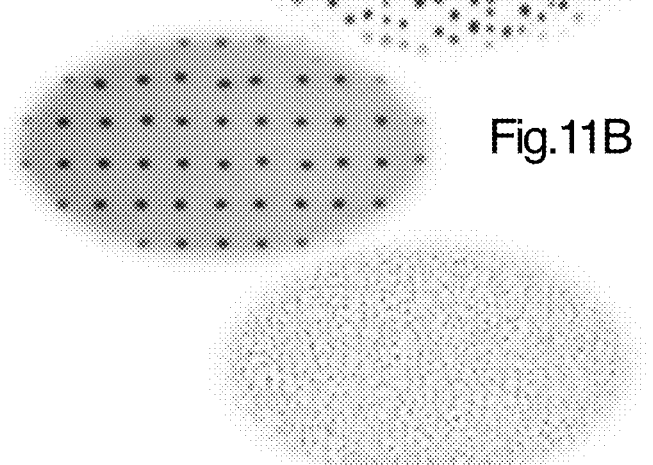
Fig.11B
Fig. 11C

INTERMEDIATE TRANSFER MEMBER

CROSS-REFERENCE TO RELATED APPLICATIONS

This application is a continuation of U.S. application Ser. No. 17/088,257 filed on Nov. 3, 2020 which is a continuation of U.S. application Ser. No. 16/303,615. U.S. application Ser. No. 16/303,615 is a national phase of PCT/IB2017/053167 which was filed on May 30, 2017 and which is incorporated by reference in its entirety for all purposes as if fully set forth herein. PCT/IB2017/053167 draws priority from U.S. Provisional Patent Application Ser. No. 62/343,108, and from GB1609463.3, both filed May 30, 2016, both of which are incorporated by reference in their entireties for all purposes as if fully set forth herein.

FIELD OF THE DISCLOSURE

The invention relates to the field of printing and, more particularly, to intermediate transfer members of printing systems.

BACKGROUND

In the art of indirect printing it is known to apply an ink, in the form of a negative of a desired image, to an intermediate transfer member (ITM), and then to transfer the ink from the intermediate transfer component to a printing substrate such as paper, cloth or plastic, thereby printing the desired image on the substrate.

The ITM is typically a sleeve mounted on a drum or a looped blanket forming a flexible belt on a conveyor system. The outermost layer of the ITM, to which the ink is applied and from which the ink is released to print the image on the substrate, is called the release layer.

Blankets suitable as intermediate transfer members require certain structural characteristics to make them suitable for the type of ink transfer envisioned and for the printing systems in which they are intended to operate. The desired properties of the blanket are generally achieved by using multi-layered structures in which the release layer may be a silicone-based polymer having suitable ink attachment and release properties, and in which the blanket base includes at least one layer adapted to support the release layer.

A printing cycle, known in the art of indirect printing, may include the following steps:
(a) applying one or more inks, (each ink including a coloring agent in a liquid carrier) as a plurality of ink droplets to form an ink image on the image transfer surface of a release layer of an intermediate transfer member;
(b) while the ink image is being transported by the intermediate transfer member, effecting at least partial evaporation of the carrier to leave an ink residue film including the coloring agents on the image transfer surfaces; and
(c) transferring the residue film from the image transfer surface to the printing substrate.

The inks may be applied to the image transfer surface by ink-jetting, typically at a printing station. The residue film obtained may be transferred from the image transfer surface to the substrate at an impression station, by engaging the intermediate transfer member with an impression cylinder.

For various reasons, it is desirable to use ink compositions including a water-based carrier rather than an organic carrier. ITM release layers having characteristically low surface energies are advantageous in that they may facilitate transfer of the dried ink image to the printing substrate. However, during the ink reception stage, the aqueous ink drops jetted onto such a low-energy, hydrophobic release layer tend to bead after the initial impact, thereby compromising image quality. Higher-energy, less hydrophobic release layers may mitigate this effect, but are detrimental to image transfer quality. In addition, the process must contend with various issues pertaining to untransferred ink remaining on the release layer surface. In high-speed, high-throughput digital printing systems, these problems become even more acute.

As described in WO 2013/132418, the ITM may be required to have several specific physical properties that may be achieved by having a complex multi-layer structure. Generally, the ITM includes a support layer, typically including a fabric, the support layer having a very limited elasticity to avoid deformation of an image during transport to an impression station. The ITM may additionally have a highly compliant thin layer immediately beneath the release later to enable the tacky film to closely follow the surface contour of the substrate. The ITM may include other layers to achieve the various desired frictional, thermal, and electrical properties of the ITM.

Due to a well-defined structure and shape, toughness and deformation-resistance, the support layer is used as the starting point when making an ITM. Specifically, manufacture of an ITM is performed by providing a support layer to which additional desired layers are added to construct the desired multi-layer structure. Typically, the different layers of the ITM are applied as a curable fluid.

The release layer having the ink transfer surface of the ITM is the last and uppermost layer that is applied and formed. The inventors have observed that the topography, contour and even surface finish of the ink transfer surface may be determined to a large extent by the contour of the surface of the penultimate layer to which the incipient release layer is applied. For this reason, it has proven difficult to manufacture an ITM having a defect-free ink transfer surface with a desired surface finish. The inventors have found that such defects may appreciably detract, in various ways, from release layer performance, a problem particularly aggravated when significant length, width and surfaces of ITM are desired.

More significantly, the inventors have recognized the need for improved release layers that are better adapted to deal with the contradictory tasks pertaining to the aqueous ink reception stage, requiring hydrophilic properties, and the ink-film transfer stage, requiring hydrophobic properties.

SUMMARY

According to some aspects of the invention, there is provided an intermediate transfer member (ITM) for use with a printing system, the ITM including:
(a) a support layer; and
(b) a release layer having an ink reception surface for receiving an ink image, and a second surface opposing the ink reception surface, the second surface attached to the support layer, the release layer formed of an addition-cured silicone material, the release layer having a thickness of at most 500 micrometers (µm).

According to features in the described preferred embodiments, the ITM satisfies at least one, and as many as all, of the following structural properties:
(1) a total surface energy of the ink reception surface is at least 2 J/m2, at least 3 J/m2, at least 4 J/m2, at least 5

J/m2, at least 6 J/m2, at least 8 J/m2, or at least 10 J/m2 higher than a total surface energy of a modified ink reception surface produced by subjecting an ink reception surface of a corresponding release layer to a standard aging procedure;

(2) a total surface energy of the ink reception surface is at least 4 J/m2, at least 6 J/m2, at least 8 J/m2, at least 10 J/m2, at least 12 J/m2, at least 14 J/m2, or at least 16 J/m2 than a total surface energy of a hydrophobic ink reception surface of a corresponding release layer prepared by standard air curing of a silicone precursor of the cured silicone material;

(3) a receding contact angle of a droplet of distilled water on the ink reception surface is at least 7°, at least 8°, at least 10°, at least 12°, at least 14°, at least 16°, at least 18°, or at least 20° lower than a receding contact angle of a droplet of distilled water on an ink reception surface of a corresponding release layer prepared by standard air curing of a silicone precursor of the cured silicone material;

(4) a receding contact angle of a droplet of distilled water on the ink reception surface is at least 5°, at least 6°, at least 7°, or at least 8° lower than a receding contact angle of a droplet of distilled water on an aged surface, produced by subjecting the ink reception surface to a standard aging procedure;

(5) a surface hydrophobicity of the ink reception surface is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area;

wherein the receding contact angle measured on the ink reception surface is at least 7°, at least 8°, at least 10°, at least 12°, at least 14°, at least 16°, at least 18°, or at least 20° lower than the receding contact angle measured on the exposed area;

(6) a receding contact angle of a droplet of distilled water on the ink reception surface is at most 60°, at most 58°, at most 56°, at most 54°, at most 52°, at most 50°, at most 48°, at most 46°, at most 44°, at most 42°, at most 40°, at most 38°, or at most 36°;

(7) the release layer is adapted such that polar groups of the ink reception surface have an orientation away from or opposite from the second surface;

(8) the release layer is adapted such that when the ITM is in an operative mode, with said ink reception surface exposed to an ambient environment, said polar groups of the ink reception surface have an orientation towards or facing said ambient environment;

(9) the ink reception surface is adapted whereby, for a droplet of distilled water deposited on the ink reception surface, a difference between a 70 second dynamic contact angle (DCA) and a 10 second DCA, is at least 6°, at least 7°, at least 8°, at least 10°, or at least 12°, optionally at most 25°, at most 22°, at most 20°, at most 18°, or at most 17°, and further optionally, within a range of 6 to 25°, 6 to 22°, 6 to 20°, 6 to 18°, 6 to 17°, 7 to 25°, 7 to 20°, 7 to 17°, 8 to 25°, 8 to 22°, 18 to 20°, 8 to 18°, 8 to 17°, 10 to 25°, 10 to 22°, 10 to 20°, 10 to 18°, or 10 to 17°;

(10) for a droplet of distilled water deposited on said ink reception surface, the 70 second DCA is at most 92°, at most 90°, at most 88°, at most 85°, at most 82°, at most 80°, at most 78°, at most 76°, at most 74°, or at most 72°, optionally at least 55°, at least 60°, at least 65°, or at least 68°, and further optionally, within a range of 55 to 92°, 55 to 90°, 55 to 85°, 55 to 80°, 65 to 92°, 65 to 90°, 65 to 85°, 65 to 80°, 68 to 85°, 68 to 80°, 70 to 92°, 70 to 90°, 70 to 85°, or 70 to 80°;

(11) for a droplet of distilled water deposited on said ink reception surface, the 10 second dynamic contact angle (DCA) is at most 108, at most 106°, at most 103°, at most 100°, at most 96°, at most 92°, or at most 88°, optionally at least 60°, at least 65°, at least 70°, at least 75°, at least 78°, at least 80°, at least 82°, at least 84°, or at least 86°, and further optionally, within a range of 60 to 108°, 65 to 105°, 70 to 105°, 70 to 100°, 70 to 96°, 70 to 92°, 75 to 105°, 75 to 100°, 80 to 105°, 80 to 100°, 85 to 105°, or 85 to 100°.

According to further features in the described preferred embodiments, the addition-cured silicone material consisting essentially of an addition-cured silicone, or containing, by weight, at least 95%, at least 96%, at least 97%, at least 98%, or at least 99% of the addition-cured silicone.

According to still further features in the described preferred embodiments, functional groups make up at most 5%, at most 3%, at most 2%, or at most 1%, by weight, of the addition-cured silicone material, or the addition-cured silicone material is substantially devoid of the functional groups.

According to still further features in the described preferred embodiments, a polyether glycol functionalized polydimethyl siloxane is impregnated in the addition-cured silicone material.

According to still further features in the described preferred embodiments, a polyether glycol functionalized siloxane is impregnated in the addition-cured silicone material, but without forming a part of a covalent structure of the addition-cured silicone material.

According to still further features in the described preferred embodiments, the thickness of the release layer is at most 500 µm, at most 200 µm, at most 100 µm, at most 50 µm, at most 25 µm, or at most 15µ, and optionally, within a range of 4 to 400 µm, 5 to 250 µm, 5 to 100 µm, 5 to 60 µm, 8-100 µm, 10-100 µm, or 10-80 µm.

According to still further features in the described preferred embodiments, the thickness of the support layer is within a range of about 50-2700 µm, 50-1500 µm, 50-1000 µm, 100-1000 µm, 100-800 µm, or 100-500 µm.

According to still further features in the described preferred embodiments, the ITM satisfies structural property (1).

According to still further features in the described preferred embodiments, the ITM satisfies structural property (2).

According to still further features in the described preferred embodiments, the ITM satisfies structural property (3).

According to still further features in the described preferred embodiments, the ITM satisfies structural property (4).

According to still further features in the described preferred embodiments, the ITM satisfies structural property (5).

According to still further features in the described preferred embodiments, the ITM satisfies structural property (6).

According to still further features in the described preferred embodiments, the ITM satisfies structural property (7).

According to still further features in the described preferred embodiments, the ITM satisfies structural property (8).

According to still further features in the described preferred embodiments, the ITM satisfies structural property (9).

According to still further features in the described preferred embodiments, the ITM satisfies structural property (10).

According to still further features in the described preferred embodiments, the ITM satisfies structural property (11).

According to still further features in the described preferred embodiments, the ITM forms a component in a digital printing system.

According to still further features in the described preferred embodiments, the support layer includes an elastomeric compliance layer attached to the second surface of the release layer, the elastomeric compliance layer adapted to follow closely a surface contour of a printing substrate onto which the ink image is impressed.

According to still further features in the described preferred embodiments, the support layer includes a reinforcement layer attached to the compliance layer.

According to still further features in the described preferred embodiments, the release layer contains, within a silicone polymer matrix thereof, a total amount of at most 3%, at most 2%, at most 1%, at most 0.5%, at most 0.2%, or substantially 0% of the functional groups, by weight.

According to still further features in the described preferred embodiments, the release layer contains, within a silicone polymer matrix thereof, a total amount of at most 3%, at most 2%, at most 1%, at most 0.5%, at most 0.2%, or substantially 0%, by weight, of functional groups selected from the group of moieties consisting of C=O, S=O, O—H, and COO.

According to still further features in the described preferred embodiments, the release layer contains, within a silicone polymer matrix thereof, a total amount of at most 3%, at most 2%, at most 1%, at most 0.5%, at most 0.2%, or substantially 0%, by weight, of functional groups selected from the group consisting of silane, alkoxy, amido, and amido-alkoxy moieties.

According to still further features in the described preferred embodiments, the release layer contains, within a silicone polymer matrix thereof, a total amount of at most 3%, at most 2%, at most 1%, at most 0.5%, at most 0.2%, or substantially 0%, by weight, of functional groups selected from the group consisting of amine, ammonium, aldehyde, $SO_2$, $SO_3$, $SO_4$, $PO_3$, $PO_4$, and C—O—C moieties.

According to still further features in the described preferred embodiments, the addition-cured silicone material has a structure built from a vinyl-functional silicone.

According to still further features in the described preferred embodiments, the addition-cured silicone material includes polar groups of the "MQ" type.

According to still further features in the described preferred embodiments, the total surface energy of the ink reception surface is evaluated using the Owens-Wendt Surface Energy Model.

According to still further features in the described preferred embodiments, the polar groups include O—Si—O groups.

According to still further features in the described preferred embodiments, the orientation away from the second surface, or towards the ambient environment, is at least 55%, at least 60%, at least 65%, at least 70%, at least 75%, or at least 80% of the polar groups, on a molar or weight basis.

According to still further features in the described preferred embodiments, the ITM has a length of up to 20 meters, and typically, within a range of 5-20, 5-15, 5-12, or 7-12 meters.

According to still further features in the described preferred embodiments, the ITM has a width of up to 2.0 meters, and typically, within a range of 0.3-2.0, 0.75-2.0, 0.75-1.5, or 0.75-1.25 meters. According to still further features in the described preferred embodiments, the ITM has a thickness of up to 3000 μm, and typically, within a range of 200-3000, 200-1500, 300-1000, 300-800, 300-700, 100-3000, 50-3000, or 100-600 μm.

Unless otherwise defined, all technical and scientific terms used herein have the same meaning as commonly understood by one of ordinary skill in the art to which the invention pertains. In case of conflict, the specification, including definitions, will take precedence.

As used herein, the term "intermediate transfer member", "image transfer member" or "transfer member" refers to the component of a printing system upon which the ink is initially applied by the printing heads, for instance by inkjet heads, and from which the jetted image is subsequently transferred to another substrate or substrates, typically, the final printing substrates. As used herein, the term "blanket" refers to a flexible transfer member that can be mounted within a printing device on a drum, or can be a belt-like structure supported by two or more rollers, at least one of which able to rotate and move the belt to travel around the rollers.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 1 schematically shows a section through a carrier;

FIGS. 2 to 6 schematically exhibit different stages in the manufacture of an ITM, according to the present method;

FIG. 7 is a section through a finished ITM after installation in a printing system;

FIGS. 8A and 8B schematically illustrate a cross section through a release layer prepared according to the prior art;

FIG. 8C schematically illustrates a cross section through a release layer prepared according to the present method;

FIGS. 10A-10C are images of various ink patterns printed onto a release layer of an ITM of the present invention, in which the release layer was cured against a PET carrier surface; and FIGS. 11A-11C are images of various ink patterns printed onto a release layer of an ITM of the prior art, in which the release layer was air cured.

DESCRIPTION

Figure 9A:
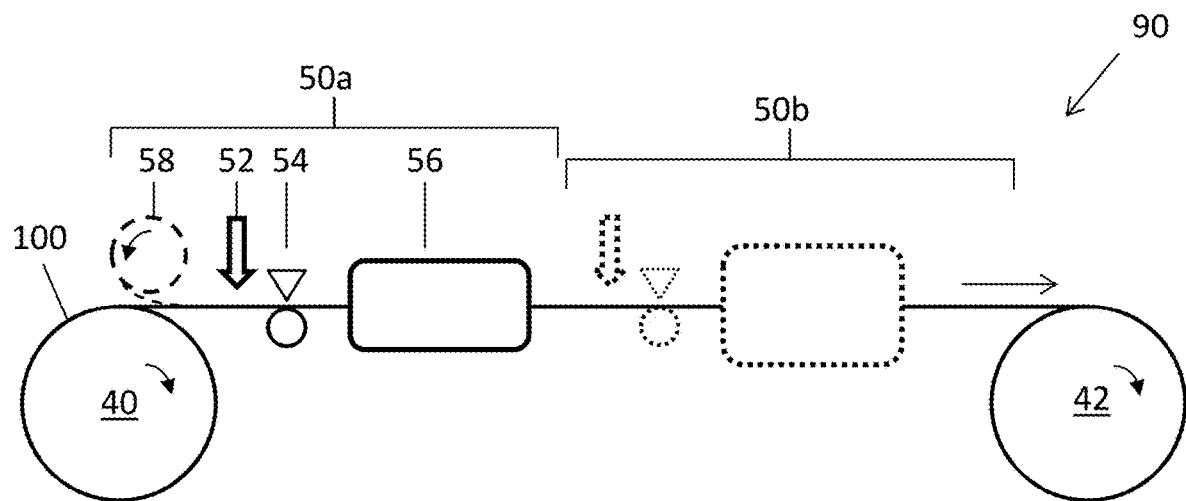
FIGS. 9A to 9D schematically display an apparatus in which some embodiments of the present method can be implemented, different manufacturing stages being illustrated.

The principles and operation of the image transfer members according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The ITM may be manufactured in the inventive manner described by FIGS. 2-7 and in the description associated therewith. Such an ITM may be particularly suitable for the Nanographic Printing™ technologies of Landa Corporation.

With reference now to FIG. 1, FIG. 1 schematically shows a section through a carrier 10. In all the drawings, to distinguish it from the layers that form part of the finished article, the carrier 10 is shown as a solid black line. Carrier 10 has a carrier contact surface 12.

In some embodiments, carrier contact surface 12 may be a well-polished flat surface having a roughness (Ra) of at most about 50 nm, at most 30 nm, at most 20 m, at most 15 nm, at most 12 nm, or more typically, at most 10 nm, at most 7 nm, or at most 5 nm. In some embodiments, carrier contact surface 12 may between 1 and 50 nm, between 3 and 25 nm, between 3 and 20 nm, or between 5 nm and 20 nm.

The hydrophilic properties of the carrier contact surface 12 are described hereinbelow.

In some embodiments, carrier 10 may be inflexible, being formed, for example, of a sheet of glass or thick sheet of metal.

In some embodiments, carrier 10 may advantageously be formed of a flexible foil, such as a flexible foil mainly consisting of, or including, aluminum, nickel, and/or chromium. In one embodiment, the foil is a sheet of aluminized PET (polyethylene terephthalate, a polyester), e.g., PET coated with fumed aluminum metal. The top coating of aluminum may be protected by a polymeric coating, the sheet typically having a thickness of between 0.05 mm and 1.00 mm so as to remain flexible but difficult to bend through a small radius, so as to avert wrinkling.

In some embodiments, carrier 10 may advantageously be formed of an antistatic polymeric film, for example, a polyester film such as PET. The anti-static properties of the antistatic film may be achieved by various means known to those of skill in the art, including the addition of various additives (such as an ammonium salt) to the polymeric composition.

In a step of the present ITM manufacturing method, the results of which are shown in FIG. 2, a fluid first curable composition (illustrated as 36 in FIG. 9B) is provided and a layer 16 is formed therefrom on carrier contact surface 12, layer 16 constituting an incipient release layer having an outer ink-transfer surface 14.

The fluid first curable composition of layer 16 may include an elastomer, typically made of a silicone polymer, for example, a polydimethylsiloxane, such as a vinyl-terminated polydimethylsiloxane.

In some embodiments, the fluid first curable material includes a vinyl-functional silicone polymer, e.g., a vinyl-silicone polymer including at least one lateral vinyl group in addition to the terminal vinyl groups, for example, a vinyl-functional polydimethyl siloxane.

In some exemplary embodiments, the fluid first curable material includes a vinyl-terminated polydimethylsiloxane, a vinyl-functional polydimethylsiloxane including at least one lateral vinyl group on the polysiloxane chain in addition to the terminal vinyl groups, a crosslinker, and an addition-cure catalyst, and optionally further includes a cure retardant.

As is known in the art, the curable adhesive composition may include any suitable amount of addition cure catalyst, typically at most 0.01% of the pre-polymer, on a per mole basis.

Exemplary formulations for the fluid first curable material are provided hereinbelow in the Examples.

Figure 9B:
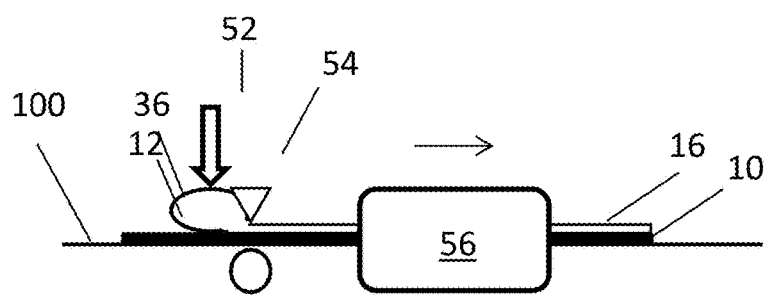

Layer 16 of the fluid first curable composition is applied to carrier contact surface 12, and is subsequently cured. Layer 16 may be spread to the desired thickness using, for example, a doctor blade (a knife on a roll), without allowing the doctor blade to contact the surface that will ultimately act as the ink-transfer surface 14 of the ITM, such that imperfections in the doctor blade will not affect the quality of the finished product. After curing, "release" layer 16 may have a thickness of between about 2 micrometers and about 200 micrometers. An apparatus in which such step and method can be implemented is schematically illustrated in FIGS. 9A and 9B.

For example, the above-detailed release layer formulation may be uniformly applied upon a PET carrier, leveled to a thickness of 5-200 micrometers (μ), and cured for approximately 2-10 minutes at 120-130° C. Surprisingly, the hydrophobicity of the ink transfer surface of the release layer so prepared, as assessed by its receding contact angle (RCA) with a 0.5-5 microliter (μl) droplet of distilled water, may be around 60°, whereas the other side of the same release layer (which served to approximate the hydrophobicity of a layer conventionally prepared with an air interface) may have an RCA that is significantly higher, typically around 90°. PET carriers used to produce ink-transfer surface 14 may typically display an RCA of around 40° or less. All contact angle measurements were performed with a Contact Angle analyzer—Krüss™ "Easy Drop" FM40Mk2 and/or a Dataphysics OCA15 Pro (Particle and Surface Sciences Pty. Ltd., Gosford, NSW, Australia).

In a subsequent step of the method, the results of which are shown in FIG. 3, an additional layer 18, referred to as a compliance layer, is applied to layer 16, on the side opposite to ink-transfer surface 14. Compliance layer 18 is an elastomeric layer that allows layer 16 and its outermost surface 14 to follow closely the surface contour of a substrate onto which an ink image is impressed. The attachment of compliance layer 18 to the side opposite to ink-transfer surface 14 may involve the application of an adhesive or bonding composition in addition to the material of compliance layer 18. Generally, compliance layer 18 may typically have a thickness of between about 100 micrometers and about 300 micrometers or more.

While compliance layer 18 may have the same composition as that of release layer 16, material and process economics may warrant the use of less expensive materials. Moreover, compliance layer 18 typically is selected to have mechanical properties (e.g., greater resistance to tension) that differ from release layer 16. Such desired differences in properties may be achieved, by way of example, by utilizing a different composition with respect to release layer 16, by varying the proportions between the ingredients used to prepare the formulation of release layer 16, and/or by the addition of further ingredients to such formulation, and/or by the selection of different curing conditions. For instance, the addition of filler particles may favorably increase the mechanical strength of compliance layer 18 relative to release layer 16.

In some embodiments, compliance layer 18 may include various rubbers. Preferably such rubbers are stable at temperatures of at least 100° C., and may include rubbers such as alkyl acrylate copolymer rubbers (ACM), methyl vinyl silicone rubber (VMQ), ethylene propylene diene monomer rubber (EPDM), fluoroelastomer polymers, nitrile butadiene rubber (NBR), ethylene acrylic elastomer (EAM), and hydrogenated nitrile butadiene rubber (HNBR).

As a non-limiting example, Silopren® LSR 2530 (Momentive Performance Materials Inc., Waterford NY), a two-component liquid silicone rubber, in which the two components are mixed at a 1:1 ratio, was applied to the cured release layer 16 previously described. The silicone rubber mixture was metered leveled with a knife blade to obtain an incipient compliance layer 18 having a thickness of about 250 micrometers, which was then cured for approximately 5 minutes at 150-160° C.

In a subsequent step of the method, the results of which are shown in FIG. 4, a reinforcement layer or support layer 20 is constructed on compliance layer 18. Support layer 20 typically contains a fiber reinforcement, in the form of a web or a fabric, to provide support layer 20 with sufficient structural integrity to withstand stretching when the ITM is held in tension in the printing system. Support layer 20 is formed by coating the fiber reinforcement with a resin that is subsequently cured and remains flexible after curing.

Alternatively, support layer 20 may be separately formed as a reinforcement layer, including such fibers embedded and/or impregnated within the independently cured resin. In this case, support layer 20 may be attached to compliance layer 18 via an adhesive layer, optionally eliminating the need to cure the support layer 20 in situ. Generally, support layer 20, whether formed in situ on compliance layer 18 or separately, may have a thickness of between about 100 micrometers and about 500 micrometers, part of which is attributed to the thickness of the fibers or the fabric, which thickness generally varies between about 50 micrometers and about 300 micrometers. However, the support layer thickness is not limiting. For heavy-duty applications, by way of example, the support layer may have a thickness of more than 200 micrometers, more than 500 micrometers, or 1 mm or more.

For example, to the multi-layered ITM structure described herein, including a vinyl-functionalized release coating 16 and a two-component silicone rubber compliance layer 18, was applied a support layer 20 including woven fabric of glass fibers. The glass fiber fabric, having a thickness of about 100 micrometers, was a plain weave fabric having 16 yarns/cm in perpendicular directions. The glass fiber fabric was embedded into a curable fluid including a liquid silicone rubber Silopren® LSR 2530 corresponding to the compliance layer. Overall, the resulting support layer 20 had a thickness of about 200 micrometers and was cured at 150° C. for approximately 2-5 minutes. Preferably, more dense weave fabrics (e.g., having 24×23 yarns/cm) may be used.

Following the in situ formation, or attachment, of support layer 20, additional layers may be built up on the reverse side thereof, as required. FIG. 5 shows an optional felt blanket 22 secured (e.g., by a cured adhesive or resin) to the reverse side of support layer 20, and FIG. 6 shows a high friction layer 24 coated onto the reverse side of blanket 22. As will be appreciated by persons skilled in the art, various relatively soft rubbers may serve for the preparation of a layer having high friction properties, silicone elastomers being but an example of such rubbers. In the absence of an intervening layer such as blanket 22, high friction layer 24 may be attached directly to support layer 20.

As mentioned, all layers (e.g., 18, 20, 22, 24, or any intervening adhesive or priming layer and the like) added to the release layer of the ITM are the to jointly form the base of the structure, as shown with respect to base 200 in FIG. 8C.

Before the ITM is used, it is necessary to remove carrier 10 to expose ink-transfer surface 14 of release layer 16, as illustrated in FIG. 7. Typically, the finished product can simply be peeled away from carrier 10.

If the carrier 10 is a flexible foil, it may be preferred to leave it in place on the ITM until such time as the ITM is to be installed into a printing system. The foil will act to protect the ink-transfer surface 14 of the ITM during storage, transportation and installation. Additionally, carrier 10 can be replaced, following completion of the manufacturing process, by an alternative foil that is suitable as a protective film.

FIGS. 9A to 9D schematically illustrate an apparatus 90 in which the ITM may be manufactured. FIG. 9A provides a schematic overview of such an apparatus 90 having an unwinding roller 40 and a winding roller 42 moving a flexible loop conveyor 100. Along the path followed by conveyor 100 can be positioned a dispensing station 52, able to dispense curable fluid compositions suitable for the desired ITMs, a leveling station 54, able to control the thickness of the curable layer as it moves downstream of the station, and a curing station 56, able to at least partially cure the layer enabling it to serve as incipient layer for a subsequent step, if any. The dispensing station 52, the leveling station 54 and the curing station 56 constitute a layer forming station 50a. As illustrated by 50b, apparatus 90 may optionally include more than one layer forming station. Furthermore, a forming station 50 may include additional sub-stations, illustrated by a dispensing roller 58 in station 50a.

In some embodiments, the need for loop conveyor 100 is obviated: carrier 10 is directly tensioned between rollers 40 and 42. Unprocessed carrier 10 is unwound from unwinding roller 40, and after passing through stations 50a and 50b, is rewound onto winding roller 42.

Though not illustrated in the figure, the apparatus may further include upstream of the dispensing station a "surface treatment" station facilitating the subsequent application of a curable composition, or its attachment to the carrier contact surface or incipient layer as the case may be. As mentioned in relation with the carrier, the optional surface treatment station (not shown) can be suitable for physical treatment (e.g., corona treatment, plasma treatment, ozonation, etc.).

FIG. 9B schematically illustrates how in a forming station 50 of apparatus 90, a carrier 10 placed on conveyor 100 can be coated. At dispensing station 52, the curable composition 36 of release layer 16 is applied to carrier contact surface 12. As carrier 10 is driven in the direction of the arrow, the curable composition 36 is leveled to a desired thickness at leveling station 54, for instance, by using a doctor blade. As the leveled layer proceeds downstream, it enters curing station 56, configured so as to at least partially cure curable composition 36, enabling the formation of incipient layer 16 at the exit side of the curing station. Such exemplary steps have been described in connection with FIGS. 1 and 2.

Figure 9C:
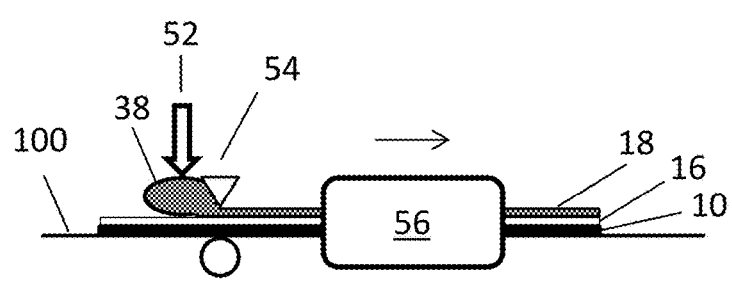
Figure 9D:
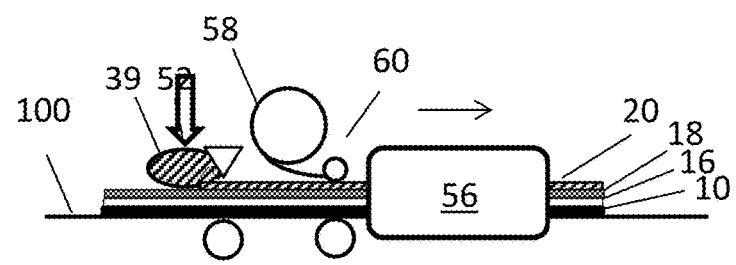

FIGS. 9C and 9D schematically illustrate how additional layers (forming the base) can be applied. In FIG. 9C, a curable composition 38 is dispensed at dispensing station 52 (which can be same or different than the station having served to coat the carrier with the release layer 16, as illustrated in FIG. 9B). Curable composition 38 is leveled to a desired thickness at leveling station 54, then enters curing station 56, and exits curing station 56 sufficiently cured to serve as incipient layer 18 for a subsequent step, and so on. Such an exemplary step has been described in connection with FIG. 3. With reference now to FIG. 9C, FIG. 9C schematically depicts a curable composition 39 being applied at dispensing station 52. The backbone of a support layer (e.g., a fabric) can be delivered by dispensing roller 58. The exemplary fabric can be submerged into the curable composition at a station 60 prior to their entry into curing station 56. In such a manner, a support layer 20 can be formed at the exit side of the curing station.

FIGS. 8A and 8B schematically illustrate how defects would appear in a section of an outer layer 80 (e.g., a release layer) prepared according to the above-described method of the art. FIG. 8A illustrates different phenomena relating to air bubbles, which may be entrapped in any curable composition if the curing occurs before such bubbles can be eliminated (e.g., by degassing). As can be seen in the figure, as tiny bubbles 82 migrate towards the air interface, the orientation of layer 80 during manufacturing over a body 800, hence the direction of migration, being indicated by an arrow, they can merge into larger bubbles. The bubbles, independently of their size, may either remain entrapped within the bulk of the layer or on its surface, the upper part of the bubbles envelope forming protrusions 84. When bubbles adjacent to the surface burst while the curing of the layer is advanced, craters 86 may remain, even if the segment of the envelope of the bubbles protruding from the surface has disappeared. These phenomena therefore typically provide a "gradient" of air bubbles, the upper sections being generally either populated by larger bubbles than the lower sections and/or having a higher density of bubbles per cross section area or per volume, lower and higher being relative to the orientation of the layer during its manufacturing. The impact of bubbles-derived defects on the surface is self-evident, the heterogeneity of the surface typically negatively affecting any subsequent interplay, for instance with an ink image. With time, such ITM being typically operated under tension and/or under pressure, craters may widen and merge to form more significant fissures. Thus, such phenomena may affect the structural integrity of the surface and any mechanical property such integrity would have conferred to the ITM.

FIG. 8B schematically illustrates different phenomena relating to solid contaminants, such as dust. Though in the present illustration, the dust is represented as being in addition to air bubbles, this need not be necessarily the case, each such surface or layer defect able to occur independently. As can be seen in the figure, solid contaminants may remain upon the surface. If the settling of contaminants occurs after the outer layer 80 is cured, then such contaminants 92 may even be removed by suitable cleaning of the outer surface. Still, such a phenomenon is undesirable, as it would require additional processing of such an ITM before being able to use it. If such contaminations occur while the layer is still uncured, then the contaminants can be either entrapped on the surface of layer 80, (e.g., contaminant 94, which appears to be "floating"), or can even be submerged within the release layer, (e.g., contaminant 96). As can be readily understood, larger/heavier contaminants may sink more deeply than smaller ones.

Unlike methods known in the art, the method disclosed herein includes forming a layer of a fluid first curable material with one side of the layer contacting a carrier contact surface, the layer constituting an incipient release layer. The carrier contact surface functions to protect the incipient release layer, giving the ink transfer layer desired properties, while the carrier acts as a physically robust support structure onto which other layers are added to form the ITM, until the ITM is complete. As a result, many potential sources of defect are avoided. Moreover, the finish of the ink transfer surface is primarily, if not exclusively, determined by the carrier contact surface.

FIG. 8C schematically illustrates a section through an outer layer 16 (e.g., a release layer) prepared according to the present method. For comparison with previous drawings, the section is shown without a carrier and in the same orientation as FIGS. 8A and 8B, though the manufacturing is performed in inversed orientation as shown by the arrow. The base 200, which, as shall be detailed hereinafter, is attached to the first outer layer 16 after the layer is at least partially cured, is therefore not equivalent to body 800 already serving as support during the manufacturing process. For the sole sake of illustration, layer 16 is represented as including an important number of bubbles 82, but this need not be the case. However, if present, such bubbles would display a distinct pattern than those previously described. First, as the now uppermost ink transfer surface 14 of layer 16 was previously in contact with a carrier, no protrusions can be observed, the release layer being therefore devoid of phenomena such as previously illustrated by surface protruding bubbles 84. Likewise, craters previously illustrated as cavities 86 are very unlikely, as they would imply using an incompatible curable layer and carrier. As according to the present method, the curable material due to form the outer layer is to suitably wet the carrier, it is believed that substantially no air bubbles can be entrapped between the carrier and the incipient layer formed thereon. Thus, if at all present, such bubbles would be disposed in the bulk of the layer. However, as the manufacturing is performed in inverted orientation as compared to conventional methods, the gradient of bubbles would, for the same reason, be inverted. Thus, and as depicted in FIG. 8C, tiny bubbles would be closer to the outer surface than larger bubbles, which would be closer to the base.

The inventive release layer structures of the present invention, produced from addition-cure formulations, may contain substantially no functional groups, or an insubstantial amount (e.g., an insubstantial amount of OH groups), covalently attached within the polymer matrix. Such functional groups may include moieties such as C=O, S=O, and OH, by way of example.

Because these release layer structures contain, at most, an insubstantial amount of such functional groups, it would be expected that the release layers thereof would be highly hydrophobic. The inventors have surprisingly found, however, that the release layer surfaces produced by the present method may actually be somewhat hydrophilic, and appreciably more hydrophilic than corresponding release layers, i.e., release layers having the same composition, but manufactured using the conventional curing technique in which the release layer is exposed to air ("standard air curing"). Without wishing to be bound by theory, the inventors believe that the intimate contact between the carrier contact surface and the incipient release layer surface, the somewhat hydrophilic properties of the carrier contact surface are induced in the release layer surface.

As discussed hereinabove, ITM release layers having low surface energies may facilitate transfer of the dried ink image to the printing substrate. However, during the ink reception stage, the aqueous ink drops jetted onto such a low-energy, hydrophobic release layer tend to bead after the initial impact, thereby compromising image quality. Higher-energy, less hydrophobic release layers may mitigate this effect, but are detrimental to image transfer quality. The inventors have found that the release layer structures of the present invention typically have release surfaces of characteristically moderated hydrophobicity, as manifested by receding contact angles for distilled water of at most 80°, or at most 70°, typically, at most 60°, or at most 50°, and more typically, 30°-60°, 35°-60°, 30°-55°, 30°-50°, 30°-45°, or 35°-50°. Surprisingly, however, both the ink reception and the transfer of the dry, heated ink image may be of good quality. It must be emphasized that yet lower values of the receding contact angle (and the dynamic contact angle discussed hereinbelow) may be achieved by employing carrier surfaces having higher hydrophilicity (lower contact angles with respect to drops of distilled water), and/or by corona (or similar) treatment.

Without wishing to be bound by theory, the inventors believe that the above-described induced surface properties improve the interactions between polar groups (e.g., O—Si—O) on the release layer surface and corresponding polar moieties (e.g., OH groups in the water) in the aqueous liquids (e.g., aqueous inkjet inks) deposited thereon, thereby contributing to the reception of the jetted ink drops. Subsequently, after drying the ink and heating of the ink film to transfer temperatures, these interactions are weakened, enabling complete transfer of the dry or substantially dry ink image. Thus, the performance of the inventive release layer structure—at both the ink reception stage and the ink film transfer stage—is appreciably better than would have been expected for a release layer having moderate hydrophobicity, but devoid of the special surface structure and properties induced by the carrier contact surface.

EXAMPLES

Reference is now made to the following examples, which together with the above descriptions, illustrate the invention in a non-limiting fashion.

List of Materials Used:

| Ingredient | Supplier | CAS Number | Description |
|---|---|---|---|
| DMS-V35 Resin | Gelest | 68083-19-2 | Vinyl terminated polydimethyl siloxane<br>Viscosity 5,000 mPa · s<br>MW ~49,500<br>Vinyl ~0.018-0.05 mmol/g |
| VQM-146 Resin | Gelest | 68584-83-8 | 20-25% Vinyl resin in DMS V46<br>Viscosity 50,000-60,000 mPa · s<br>Vinyl ~0.18-0.23 mmol/g |
| Inhibitor 600 Cure Retardant | Evonik | 204-070-5 | Mix of divinylpolydimethylsiloxane and 2-methylbut-3-yn-2-ol<br>Viscosity 900 mPa · s<br>Vinyl 0.11 mmol/g |
| SIP6831.2 Catalyst | Gelest | 68478-92-2 | Platinum divinyltetramethyldisiloxane<br>Platinum 2.1-2.4% |
| Polymer RV 5000 (XPRV 5000) Resin | Evonik | | Vinyl-functional polydimethyl siloxanes<br>Viscosity 3000 mPa · s<br>Vinyl 0.4 mmol/g |
| Crosslinker 100 Crosslinker | Evonik | | Polydimethyl siloxanes including SiH groups in the polymer chain<br>Hydride 7.8 mmol/g |
| HMS-301 Crosslinker | Gelest | 68037-59-2 | Poly(dimethylsiloxane-co-methylhydrosiloxane), trimethylsilyl terminated<br>Hydride 4.2 mmol/g |
| Silsurf A010-D-UP Additive | Siltech | 134180-76-0 | polyether siloxane copolymer |
| SilGrip SR 545 Functional MQ resin | Momentive | 56275-01-5 | Silicone-based resin containing "MQ" groups<br>Viscosity 11 mPa · s |
| Aluminized PET | Hanita Ltd. | NR | Aluminized polyester film |
| Skyroll SH 92 | SKC Inc. | NR | Anti-static polyester film |
| Skyroll SH 76 | SKC Inc. | NR | Untreated polyester film |

The carriers used as substrates in the production of the release layer surface include (1) an anti-static polyester film (Examples 1-7); (2) an untreated polyester film i.e., not anti-static (Example 11); and (3) an aluminized polyester film (Example 10).

Example 1

The ITM release layer of Example 1 had the following composition (wt./wt.):

| Name | Parts |
|---|---|
| DMS-V35 | 70 |
| XPRV-5000 | 30 |
| VQM-146 | 40 |
| Inhibitor 600 | 5 |

-continued

| Name | Parts |
| --- | --- |
| SIP6831.2 | 0.1 |
| Crosslinker HMS-301 | 12 |

The release layer was prepared substantially as described in the present blanket preparation procedure, provided below.

Blanket Preparation Procedure (for release layers cured against a carrier surface)

All components of the release layer formulation were thoroughly mixed together. The desired thickness of the incipient release layer was coated on a PET sheet, using a rod/knife (other coating methods may also be used), followed by curing for 3 minutes at 150° C. Subsequently, Siloprene LSR 2530 was coated on top of the release layer, using a knife, to achieve a desired thickness. Curing was then performed at 150° C. for 3 minutes. An additional layer of Siloprene LSR 2530 was then coated on top of the previous (cured) silicone layer, and fiberglass fabric was incorporated into this wet, fresh layer such that wet silicone penetrated into the fabric structure. Curing was then performed at 150° C. for 3 minutes. A final layer of Siloprene LSR 2530 was then coated onto the fiberglass fabric and, once again, curing was performed at 150° C. for 3 minutes. The integral blanket structure was then cooled to room temperature and the PET was removed.

Example 2

The ITM release layer of Example 2 has the following composition:

| Component Name | Parts |
| --- | --- |
| DMS-V35 | 70 |
| XPRV-5000 | 30 |
| VQM-146 | 40 |
| Inhibitor 600 | 5 |
| SIP6831.2 | 0.1 |
| Crosslinker HMS-301 | 12 |
| Silsurf A010-D-UP | 5 |

The blanket was prepared substantially as described in Example 1.

Example 3

The ITM release layer of Example 3 has the following composition:

| Component Name | Parts |
| --- | --- |
| DMS-V35 | 70 |
| XPRV-5000 | 30 |
| VQM-146 | 40 |
| Inhibitor 600 | 5 |
| SIP6831.2 | 0.1 |
| Crosslinker 100 | 6.5 |
| Silsurf A010-D-UP | 5 |

The blanket was prepared substantially as described in Example 1.

Example 4

The ITM release layer of Example 4 has the following composition:

| Component Name | Parts |
| --- | --- |
| DMS-V35 | 100 |
| VQM-146 | 40 |
| Inhibitor 600 | 3 |
| SIP6831.2 | 0.1 |
| Crosslinker HMS-301 | 5 |

The blanket was prepared substantially as described in Example 1.

Example 5

The ITM release layer of Example 5 was prepared from Silopren® LSR 2530 (Momentive Performance Materials Inc., Waterford, NY), a two-component liquid silicone rubber, in which the two components are mixed at a 1:1 ratio. The blanket was prepared substantially as described in Example 1.

Example 6

The ITM release layer of Example 6 has a composition that is substantially identical to that of Example 4, but includes SR545 (Momentive Performance Materials Inc., Waterford, NY), a commercially available silicone-based resin containing polar groups. The polar groups are of the "MQ" type, where "M" represents $Me_3SiO$ and "Q" represents $SiO_4$. The full composition is provided below:

| Component Name | Parts |
| --- | --- |
| DMS-V35 | 100 |
| VQM-146 | 40 |
| SR545 | 5 |
| Inhibitor 600 | 3 |
| SIP6831.2 | 0.1 |
| Crosslinker HMS-301 | 5 |

The blanket was prepared substantially as described in Example 1.

Example 7

The ITM release layer of Example 7 has a composition that is substantially identical to that of Example 6, but includes polymer RV 5000, which includes vinyl-functional polydimethyl siloxanes having a high density of vinyl groups, as described hereinabove. The full composition is provided below:

| Component Name | Parts |
| --- | --- |
| DMS-V35 | 70 |
| RV 5000 | 30 |
| VQM-146 | 40 |
| Inhibitor 600 | 5 |
| SIP6831.2 | 0.1 |
| Crosslinker HMS-301 | 12 |
| SR545 | 5 |

The blanket was prepared substantially as described in Example 1.

Comparative Examples 1A-1F

ITM release layers were prepared as "corresponding release layers" or "reference release layers" to the compositions of Examples 1-6, such that the corresponding release layers (designated Comparative Examples 1A-1F) had the identical compositions as Examples 1-6, respectively. However, during the curing of the release layer, the release layer surface (or "ink reception surface") was exposed to air ("standard air curing"), according to a conventional preparation procedure, provided below.

Comparative Blanket Preparation Procedure (for release layers exposed to air during curing)

A first layer of Siloprene LSR 2530 was coated on a PET sheet, using a rod/knife, followed by curing for 3 min at 150° C., to achieve the desired thickness. An additional layer of Siloprene LSR 2530 was then coated on top of the previous (cured) silicone layer, and fiberglass fabric was incorporated into this wet, fresh layer such that wet silicone penetrated into the fabric structure. Siloprene LSR 2530 was then coated on top of the fiberglass fabric, and curing ensued at 150° C. for 3 minutes. Prior to forming the incipient release layer, all components of the release layer formulation were thoroughly mixed together. The release layer was coated on top of cured Siloprene LSR 2530 to achieve the desired thickness, and was subsequently cured at 150° C. for 3 minutes, while the release layer surface was exposed to air.

Example 8

Contact angles of drops of distilled water on release layer surfaces were measured using a dedicated Dataphysics OCA15 Pro contact angle measuring device (Particle and Surface Sciences Pty. Ltd., Gosford, NSW, Australia). The procedure used for performing the Receding Contact Angle (RCA) and Advancing Contact Angle (ACA) measurements is a conventional technique elaborated by Dr. Roger P. Woodward ("Contact Angle Measurements Using the Drop Shape Method", inter alia, www.firsttenangstroms.com/pdfdocs/CAPaper.pdf).

The results for Examples 1-6 are provided below, along with the results for the release layers produced according to Comparative Examples 1A-1F.

In virtually all cases, the release surfaces produced against the carrier surfaces exhibited lower Receding Contact Angles than the identical formulation, cured in air. More typically, the release surfaces produced against the carrier surfaces exhibited Receding Contact Angles that were lower by at least 5°, at least 7°, at least 10°, at least 12°, or at least 15°, or were lower within a range of 5°-30°, 7°-30°, 10°-30°, 5°-25°, 5°-22°, 7°-25°, or 10°-25°.

Example 9

The release surfaces produced in Examples 1-6 and the respective release surfaces produced in Comparative Examples 1A-1F were aged at 160° C. for 2 hours, to simulate the aging of the release layer under extended operating conditions. Receding Contact Angles were measured, and the results are provided below:

| Release formulation | Release Surface vs. PET | | | Release Surface vs. Air | |
|---|---|---|---|---|---|
| | RCA before aging | RCA after aging | Comparative release formulation | RCA before aging | RCA after aging |
| Example 1 | 75° | 80° | Comparative Example 1A | 95° | 95° |
| Example 2 | 45° | 60° | Comparative Example 1B | 65° | 65° |
| Example 3 | 40° | 50° | Comparative Example 1C | 63° | 65° |
| Example 4 | 65° | 62° | Comparative Example 1D | 79° | 75° |
| Example 5 | 70° | 74° | Comparative Example 1E | 80° | 80° |
| Example 6 | 56° | 70° | Comparative Example 1F | 74° | 70° |

With regard to the comparative examples, it is evident that the receding contact angle is substantially maintained after performing the aging process. With regard to inventive Examples 1-6, however, it is evident that the receding contact angle increases, typically by 4°-15°, after performing the aging process. Without wishing to be bound by theory, the inventors believe that the increase in contact angle in the inventive release layer structures may be attributed to a loss in hydrophilic behavior (or increased hydrophobic behavior) due to some change in the position of the polar groups (e.g., Si—O—Si) at the release layer surface.

Example 10

A blanket including a release layer of the composition of Example 2 was prepared substantially as described in Example 1, but against an aluminized PET carrier surface.

Example 11

A release layer having the release layer composition of Example 2 was prepared substantially as described in Example 1, but against a commercially available PET carrier surface that was not subjected to an anti-static pre-treatment.

Example 12

The release layers produced in Examples 2, 10, and 11, in accordance with the present invention, were subjected to contact angle measurements, to determine both the advancing contact angle and the receding contact angle. The results are provided below:

| Release formulation | Carrier film | RCA vs. Carrier |
|---|---|---|
| Example 10 | Aluminized PET | 62° |
| Example 11 | PET without anti-static treatment | 62° |
| Example 2 | PET with anti-static treatment | 45° |

Examples 10 and 11 exhibited receding contact angles that were about 30° less than the receding contact angle of the same composition cured with the release layer exposed to air. The release layer surface of Example 2, prepared against an anti-static PET carrier surface, displayed a receding contact angles that was about 50° less than the receding contact angle of the same composition prepared while exposed to air.

Example 13

The carrier surfaces utilized in Examples 2, 10, and 11 were subjected to contact angle measurements, to determine both the advancing contact angle and the receding contact angle. The results are provided below:

| Carrier film | CA of carrier | |
|---|---|---|
| | ACA | RCA |
| Aluminized PET | 80° | 40° |
| PET without antistatic treatment | 70° | 40° |
| PET with antistatic treatment | 40° | 20° |

It may be seen from the receding contact angles obtained that the three carrier surfaces exhibit hydrophilic behavior, and that the PET subjected to anti-static treatment exhibits the greatest degree of hydrophilic behavior (20° RCA vs. 40° RCA).

Significantly, the hydrophilic behavior of the carrier surfaces has been at least partially induced in the respective release surfaces: the formulation cured while exposed to air has an RCA of 65°; the same formulation, prepared against an antistatic PET surface, has an RCA of 45°; the anti-static PET carrier used displays an RCA of 20°. Thus, the inventive release layer structure has a release surface whose hydrophilicity/hydrophobicity properties lie in between the properties of the same formulation, cured in air, and the carrier surface itself.

Example 14

Release layer surface energies were calculated for ink reception surfaces of the following Examples: Example 1A, cured under exposure to air; Example 1, cured against an anti-static PET surface; and Example 1, cured against an anti-static PET surface and then subjected to the standard aging procedure at 160° C., for 2 hours. The three Examples have the identical chemical formulation.

For each of these examples, the total surface energy was calculated using the classic "harmonic mean" method (also known as the Owens-Wendt Surface Energy Model, see, by way of example, KRUSS Technical Note TN306e). The results are provided below:

| Release formulation | Total Surface Energy J/m$^2$ |
|---|---|
| Example 1A—Air Cured | 20.9 |
| Example 1—Aged | 22.6 |
| Example 1 | 26.1 |

In Example 1A, cured under exposure to air, the release layer surface is extremely hydrophobic, and the total surface energy of the surface is low, 20.9 J/m2, as expected. This is fairly close to the literature value for surface energy, for polydimethylsiloxane (PDMS). Significantly, Example 1, which was cured against an anti-static PET surface, exhibited a total surface energy of about 26 J/m2, which is moderately less hydrophobic than the "air-cured" sample. After this formulation was subjected to the standard aging procedure, the total surface energy decreased from about 26 J/m2 to under 26 J/m2. This result would appear to corroborate the RCA results obtained for the various aged and un-aged materials of this exemplary formulation.

Example 15

Release layer surface energies were calculated for ink reception surfaces of the following Examples: Example 2A, cured under exposure to air; Example 2, cured against an anti-static PET surface; and Example 2, cured against an anti-static PET surface and then subjected to the standard aging procedure at 160° C., for 2 hours. The three Examples have the identical chemical formulation.

As in Example 14, the total surface energy was calculated using the classic "harmonic mean" method. The results are provided below:

| Release formulation | Total Surface Energy (J/m$^2$) |
|---|---|
| Example 2A—Air Cured | 34.6 |
| Example 2—Aged | 39.9 |
| Example 2 | 49.1 |

In Example 2A, cured under exposure to air, the release layer surface is less hydrophobic than the release layer of Example 1A, the total surface energy of the surface being about 35 J/m2. Example 2, cured against an anti-static PET surface, exhibited a total surface energy of about 49 J/m2, which is significantly less hydrophobic than the "air-cured" sample. After this formulation was subjected to the standard aging procedure, the total surface energy decreased from about 49 J/m2 to about 40 J/m2. This result would appear to corroborate the RCA results obtained for the various aged and un-aged materials of this exemplary formulation.

Example 16

The temperature on the blanket surface is maintained at 75° C. The image (typically a color gradient of 10-100%) is printed at a speed of 1.7 m/sec on the blanket, at a resolution of 1200 dpi. An uncoated paper (A4 Xerox Premium Copier Paper, 80 gsm) is set between the pressure roller and the blanket and the roller is pressed onto blanket, while the pressure is set to 3 bar. The roller moves on the paper, applying pressure on the contact line between blanket and paper and promoting the transfer process. In some cases, incomplete transfer may be observed, with an ink residue remaining on the blanket surface. In order to evaluate the extent of that ink residue, glossy paper (A4 Burgo glossy paper 130 gsm) is applied on the blanket similarly to the uncoated paper and the transfer process is again performed. Any ink that remained on blanket and was not transferred to the uncoated paper will be transferred to the glossy paper. Thus, the glossy paper may be evaluated for ink residue, according to the following scale (% of image surface area):

A—no visible residue

B—1-5% visible residue

C—more than 5% visible residue

Results of the evaluation are provided below:

| Release formulation | Transfer grade |
|---|---|
| Example 4 | B |
| Example 1 | B |
| Example 2 | A |
| Example 3 | A |
| Example 6 | C |

Example 17

Example 16 was repeated for the release surfaces of Examples 2 and 3, but at a printing speed of 3.4 m/sec on the blanket. Both release surfaces retained a transfer grade of A.

Example 18

The ITM release layer compositions of Examples 2 and 3 were cured against a PET substrate according to the procedure provided in Example 1. The ITM release layer compositions of Examples 2 and 3 were cured against air, according to the procedure provided in Comparative Examples 1B and 1C. The samples were then subjected to dynamic contact angle (DCA) measurements at 10 seconds and subsequently at 70 seconds, according to the following procedure:

The drop is placed onto a smooth PTFE, film surface with as little drop falling as possible, so that kinetic energy does not spread the drop. A pendant drop is then formed. Subsequently, the specimen is raised until it touches the bottom of the drop. If the drop is large enough, the adhesion to the surface will pull it off the tip of the needle. The needle tip is positioned above the surface at such a height that the growing pendant drop will touch the surface and detach before it falls free due to its own weight.

The dynamic contact angle is then measured at 10 seconds and at 70 seconds. The results are provided below:

| | Dynamic contact angle | | | |
|---|---|---|---|---|
| | Cured against PET | | Cured against Air | |
| Example | after 10 sec | after 70 sec | after 10 sec | after 70 sec |
| Ex 2 | 105° | 97° | 114° | 103° |
| Ex 3 | 87° | 70° | 113° | 94° |

It is observed that the initial measurement of the dynamic contact angle, at 10 seconds, provides a strong indication of the hydrophilicity of the release layer surface. The subsequent measurement at 70 seconds provides an indication of the extent to which any liquid (such as a polyether glycol functionalized polydimethyl siloxane) disposed within the release layer has been incorporated into the drop. Such incorporation may further reduce the measured DCA.

Thus, the samples cured against PET exhibit substantially lower (more hydrophilic) initial DCA measurements (105°, 87°) relative to the hydrophilic initial DCA measurements (114°, 113°) of the respective samples cured against air. In addition to displayed hydrophilicity, the samples cured against PET exhibited a drop in DCA of 8 to 17° between the first and second measurements.

FIGS. 10A-10C provide images of various ink patterns printed onto a release layer of an ITM of the present invention, in which the release layer of Example 2 was cured against the PET carrier surface. FIGS. 11A-11C are images of the same ink patterns printed onto a release layer of Example 2, but in which the release layer was cured against air. Comparing between FIGS. 10A and 11A, it is manifest that the release layer of the inventive ITM exhibits a higher optical density, and more accurately reflects the ink image pattern. A comparison between FIGS. 10C and 11C yields the identical conclusion. Comparing now between FIGS. 10B and 11B, it is evident that each ink dot in FIG. 10B is appreciably larger than the respective ink dots in FIG. 11B.

As used herein in the specification and in the claims section that follows, the term "receding contact angle" or "RCA", refers to a receding contact angle as measured using a Dataphysics OCA15 Pro Contact Angle measuring device, or a comparable Video-Based Optical Contact Angle Measuring System, using the above-described Drop Shape Method, at ambient temperatures. The analogous "advancing contact angle", or "ACA", refers to an advancing contact angle measured substantially in the same fashion.

As used herein in the specification and in the claims section that follows, the term "dynamic contact angle" or "DCA", refers to a dynamic contact angle as measured using a Dataphysics OCA15 Pro Contact Angle measuring device, or a comparable Video-Based Optical Contact Angle Measuring System, using the method elaborated by Dr. Roger P. Woodward in the above-referenced "Contact Angle Measurements Using the Drop Shape Method", at ambient temperatures, and as elaborated hereinabove in Example 17.

As used herein in the specification and in the claims section that follows, the term "standard aging procedure" refers to an accelerated aging protocol performed on each tested release layer at 160° C., for 2 hours, in a standard convection oven.

As used herein in the specification and in the claims section that follows, the term "standard air curing" refers to a conventional curing process for curing the release layer, described with respect to Comparative Examples 1A-1F, in which, during the curing of the release layer, the release layer surface (or "ink reception surface") is exposed to air.

As used herein in the specification and in the claims section that follows, the term "bulk hydrophobicity" is characterized by a receding contact angle of a droplet of distilled water disposed on an inner surface of the release layer, the inner surface formed by exposing an area of the cured silicone material within the release layer.

As used herein in the specification and in the claims section that follows, the terms "hydrophobicity" and "hydrophilicity" and the like, may be used in a relative sense, and not necessarily in an absolute sense.

As used herein in the specification and in the claims section that follows, the term "functional group" refers to a group or moiety attached to the polymer structure of the release layer, and having a higher polarity than the O—Si—O group of conventional addition-cured silicones. Various examples are provided herein. The inventors observe that pure addition cure polydimethyl siloxane polymer contains O—Si—O, $SiO_4$, Si—$CH_3$ and C—C groups, and that most other functional groups will have a higher dipole, such that they may be considered "functional". It will be appreciated by those of skill in the art that such functional groups, may have a tendency or strong tendency to react with components typically present in aqueous inks utilized in indirect inkjet printing, at process temperatures of up to 120° C.

As used herein in the specification and in the claims section that follows, the term "%" refers to percent by weight, unless specifically indicated otherwise.

Similarly, the term "ratio", as used herein in the specification and in the claims section that follows, refers to a weight ratio, unless specifically indicated otherwise.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the present invention has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the invention as defined in the appended claims and any deviations falling within their range of equivalency.

To the extent necessary to understand or complete the disclosure of the present invention, all publications, patents, and patent applications mentioned in this specification, including WO 2013/132418, are expressly incorporated in their entirety by reference into the specification, to the same extent as if each individual publication, patent or patent application was specifically and individually indicated to be incorporated herein by reference.

Citation or identification of any reference in this application shall not be construed as an admission that such reference is available as prior art to the invention.

Certain marks referenced herein may be common law or registered trademarks of third parties. Use of these marks is by way of example and shall not be construed as descriptive or limit the scope of this invention to material associated only with such marks.

What is claimed is:

1. An indirect printing system comprising:
   (a) an intermediate transfer member (ITM) having a release layer having an ink reception surface;
   (b) a plurality of printing heads configured to apply an ink image to the ink reception surface of the ITM,
   wherein:
   I. the release layer is formed of a silicone material;
   II. the ink reception surface of the release layer is adapted to satisfy at least one of the following structural properties:
      (i) a receding contact angle of a droplet of distilled water on said ink reception surface is at most 60°; and
      (ii) for a droplet of distilled water deposited on said ink reception surface, a 10 second dynamic contact angle (DCA) is at most 108°; and
   III. the release layer has at least one of the following structural properties:
      (1) said silicone material consisting essentially of a silicone, or containing, by weight, at least 95% of said silicone; and
      (2) functional groups make up at most 5% by weight, of said silicone material.

2. The indirect printing system of claim 1, wherein said receding contact angle is at most 58°, at most 56°, at most 54°, at most 52°, at most 50°, at most 48°, at most 46°, at most 44°, at most 42°, at most 40°, at most 38°, or at most 37°.

3. The indirect printing system of claim 1, wherein said functional groups make up at most 3%, at 2%, at most 1%, at most 0.5%, at most 0.2%, or at most 0.1%, by weight, of said silicone material, or wherein said silicone material is substantially devoid of said functional groups.

4. The indirect printing system of claim 1, wherein a polyether glycol functionalized polydimethyl siloxane is impregnated in said silicone material.

5. The indirect printing system of claim 1, wherein a total surface energy of the ink reception surface is at least 2 $J/m^2$, at least 3 $J/m^2$, at least 4 $J/m^2$, at least 5 $J/m^2$, at least 6 $J/m^2$, at least 8 $J/m^2$, or at least 10 $J/m^2$ higher than a total surface energy of a modified ink reception surface produced by subjecting an ink reception surface of a corresponding release layer to 160° C. for 2 hours.

6. The indirect printing system of claim 1, wherein the silicone material is a cured silicone material, and wherein a total surface energy of the ink reception surface is at least 4 $J/m^2$, at least 6 $J/m^2$, at least 8 $J/m^2$, at least 10 $J/m^2$, at least 12 $J/m^2$, at least 14 $J/m^2$, or at least 16 $J/m^2$ more than a total surface energy of a hydrophobic ink reception surface of a corresponding release layer prepared by air exposure curing of a silicone precursor of the cured silicone material.

7. The indirect printing system of claim 1, wherein the silicon material is a silicone cured material, and wherein a receding contact angle of a droplet of distilled water on the ink reception surface is at least 7°, at least 8°, at least 10°, at least 12°, at least 15°, at least 18°, or at least 20° lower than a receding contact angle of a droplet of distilled water on an ink reception surface of a corresponding release layer prepared by air exposure curing of a silicone precursor of the cured silicone material.

8. The indirect printing system of claim 1, wherein: (i) the release layer of the ITM further has a second surface opposing the ink reception surface, (ii) the release layer is adapted such that polar groups of the ink reception surface have an orientation away from or opposite from the second surface.

9. The indirect printing system of claim 1, wherein the release layer is adapted such that when the ITM is in an operative mode, with said ink reception surface exposed to an ambient environment, said polar groups of the ink reception surface have an orientation towards or facing said ambient environment.

10. The indirect printing system of claim 1, configured to transfer the ink image from the ink reception surface of the ITM to substrate.

11. The indirect printing system of claim 1 wherein the silicone material from which the release layer is formed is a cured silicone material and wherein at least one of the following is true:
   (1) said cured silicone material consisting essentially of cured silicone, or containing, by weight, at least 95% of said addition-cured silicone;
   (2) functional groups make up at most 5%, by weight, of said cured silicone material.

12. The indirect printing system of claim 1 wherein the silicone material from which the release layer is formed is an addition-cured silicone material and wherein at least one of the following is true:

(1) said addition-cured silicone material consisting essentially of an addition-cured silicone, or containing, by weight, at least 95% of said addition-cured silicone;
(2) functional groups make up at most 5%, by weight, of said addition-cured silicone material.

13. An indirect printing system comprising:
(a) an intermediate transfer member (ITM) having a release layer having an ink reception surface, the ITM mounted on a drum or mounted over a plurality of rollers as a belt-like structure; and
(b) a printing station configured to form an ink image, from ink droplets, on the ink reception surface of the ITM,
wherein:
I. the release layer is formed of a silicone material;
II. the ink reception surface of the release layer is adapted to satisfy at least one of the following structural properties:
   (i) a receding contact angle of a droplet of distilled water on said ink reception surface is at most 60°; and
   (ii) for a droplet of distilled water deposited on said ink reception surface, a 10 second dynamic contact angle (DCA) is at most 108°; and
III. the release layer has at least one of the following structural properties:
   (1) said silicone material consisting essentially of a silicone, or containing, by weight, at least 95% of said silicone; and
   (2) functional groups make up at most 5%, by weight, of said silicone material.

14. The printing system of claim 13 wherein the ITM is mounted over a plurality of rollers as a belt-like structure.

15. A mounted-ITM system for use in indirect printing, the mounted-ITM comprising:
(a) an intermediate transfer member (ITM) having a release layer having an ink reception surface; and
(b) a support structure selected from the group consisting of: (i) a drum and (ii) a plurality of rollers, said ITM being mounted over the support structure,
wherein:
I. the release layer is formed of a silicone material;
II. the ink reception surface of the release layer is adapted to satisfy at least one of the following structural properties:
   (i) a receding contact angle of a droplet of distilled water on said ink reception surface is at most 60°; and
   (ii) for a droplet of distilled water deposited on said ink reception surface, a 10 second dynamic contact angle (DCA) is at most 108°; and
III. the release layer has at least one of the following structural properties:
   (1) said silicone material consisting essentially of a silicone, or containing, by weight, at least 95% of said silicone; and
   (2) functional groups make up at most 5%, by weight, of said silicone material.

16. The mounted-ITM system of claim 15 wherein the ITM is mounted over a plurality of rollers as a belt-like structure.

17. The mounted-ITM printing system of claim 15 wherein the silicone material from which the release layer is formed is a cured silicone material and wherein at least one of the following is true:
(1) said cured silicone material consisting essentially of cured silicone, or containing, by weight, at least 95% of said addition-cured silicone;
(2) functional groups make up at most 5%, by weight, of said cured silicone material.

18. The mounted-ITM system of claim 15 wherein the silicone material from which the release layer is formed is an addition-cured silicone material and wherein at least one of the following is true:
(1) said addition-cured silicone material consisting essentially of an addition-cured silicone, or containing, by weight, at least 95% of said addition-cured silicone;
(2) functional groups make up at most 5%, by weight, of said addition-cured silicone material.

19. The mounted-ITM system of claim 15, wherein; (i) the release layer of the ITM further has a second surface opposing the ink reception surface, (ii) the release layer is adapted such that polar groups of the ink reception surface have an orientation away from or opposite from the second surface.

20. The mounted-ITM system of claim 15, wherein the release layer is adapted such that when the ITM is in an operative mode, with said ink reception surface exposed to an ambient environment, said polar groups of the ink reception surface have an orientation towards or facing said ambient environment.

* * * * *